US012009142B2

(12) United States Patent
Jeon et al.

(10) Patent No.: US 12,009,142 B2
(45) Date of Patent: Jun. 11, 2024

(54) COIL COMPONENT

(71) Applicant: SAMSUNG ELECTRO-MECHANICS CO., LTD., Suwon-si (KR)

(72) Inventors: Ji Su Jeon, Suwon-si (KR); Ji Young Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 569 days.

(21) Appl. No.: 17/194,656

(22) Filed: Mar. 8, 2021

(65) Prior Publication Data

US 2022/0189678 A1 Jun. 16, 2022

(30) Foreign Application Priority Data

Dec. 14, 2020 (KR) ........................ 10-2020-0174347

(51) Int. Cl.
*H01F 27/28* (2006.01)
*H01F 27/24* (2006.01)
(Continued)

(52) U.S. Cl.
CPC ......... *H01F 27/2804* (2013.01); *H01F 27/24* (2013.01); *H01F 27/29* (2013.01);
(Continued)

(58) Field of Classification Search
CPC ...... H01F 27/2804; H01F 27/24; H01F 27/29; H01F 27/324; H01F 2027/2809;
(Continued)

(56) References Cited

U.S. PATENT DOCUMENTS

2016/0086714 A1* 3/2016 Moon .................. H01F 27/292 336/200
2016/0111195 A1* 4/2016 Nishyama ............... H01F 17/04 336/200
(Continued)

FOREIGN PATENT DOCUMENTS

JP 2012-248628 A 12/2012
KR 10-2018-0072482 A 6/2018

*Primary Examiner* — Shawki S Ismail
*Assistant Examiner* — Kazi S Hossain
(74) *Attorney, Agent, or Firm* — MORGAN, LEWIS & BOCKIUS LLP

(57) ABSTRACT

A coil component includes a body having first and second end surfaces opposing each other and first and second side surfaces opposing each other in a first direction; a support substrate disposed in the body; and a coil portion including a first coil pattern disposed on the support substrate, and first and second lead-out patterns respectively exposed to the first and second end surfaces of the body. A distance between the first side surface of the body and the first lead-out pattern in the first direction is smaller than a distance between the second side surface of the body and the first lead-out pattern in the first direction, and a distance between the first side surface of the body and the second lead-out pattern in the first direction is smaller than a distance between the second side surface of the body and the second lead-out pattern in the first direction.

22 Claims, 5 Drawing Sheets

1000

(51) Int. Cl.
*H01F 27/29* (2006.01)
*H01F 27/32* (2006.01)
*H01F 41/04* (2006.01)

(52) U.S. Cl.
CPC ......... *H01F 27/324* (2013.01); *H01F 41/041* (2013.01); *H01F 2027/2809* (2013.01)

(58) Field of Classification Search
CPC ........... H01F 17/0013; H01F 2017/048; H01F 27/292; H01F 27/022; H01F 27/28; H01F 27/306; H01F 27/02; H01F 2017/002
USPC ................................. 336/200, 232, 192, 198
See application file for complete search history.

(56) References Cited

U.S. PATENT DOCUMENTS

2016/0351319 A1* 12/2016 Jeong .................. H01F 17/0033
2018/0174727 A1 6/2018 Kim et al.
2018/0366246 A1* 12/2018 Park ........................ H01F 17/04
2020/0373055 A1* 11/2020 Jeong .................... H01F 27/292

* cited by examiner

COIL COMPONENT

CROSS-REFERENCE TO RELATED APPLICATION(S)

The present application claims the benefit of priority to Korean Patent Application No. 10-2020-0174347, filed on Dec. 14, 2020 in the Korean Intellectual Property Office, the disclosure of which is incorporated herein by reference in its entirety.

TECHNICAL FIELD

The present disclosure relates to a coil component.

BACKGROUND

An inductor, one type of coil component, is a representative passive electronic component used together with a resistor and a capacitor in electronic devices.

In the case of a thin film-type inductor, a coil bar in which a plurality of coils are connected to each other is formed using a large-area substrate, and bodies of the plurality of coil component are individualized by dicing the coil bar. In the dicing process, chipping defects such as cracks, or the like, may occur at a cutting interface due to different materials between the body and the coil.

The above-described chipping defects may increase when the thickness of a cover region disposed on the coil of the body is relatively thin.

SUMMARY

An aspect of the present disclosure is to provide a coil component capable of reducing chipping defects.

An aspect of the present disclosure is to provide a coil component capable of securing an inductance (Ls) while reducing an overall thickness of the component.

According to an aspect of the present disclosure, a coil component includes: a body having a first end surface and a second end surface opposing each other, and having a first side surface and a second side surface connecting the first end surface and the second end surface and opposing each other in a first direction; a support substrate disposed in the body; and a coil portion including a first coil pattern disposed on a first surface of the support substrate, and first and second lead-out patterns connected to the first coil pattern and respectively exposed to the first end surface and the second end surface of the body. A distance between the first side surface of the body and the first lead-out pattern in the first direction is smaller than a distance between the second side surface of the body and the first lead-out pattern in the first direction, and a distance between the first side surface of the body and the second lead-out pattern in the first direction is smaller than a distance between the second side surface of the body and the second lead-out pattern in the first direction.

According to another aspect of the present disclosure, a coil component includes: a body having a first end surface and a second end surface opposing each other, and having a first side surface and a second side surface connecting the first end surface and the second end surface and opposing each other in a first direction; a support substrate disposed in the body; and a coil portion including a first coil pattern disposed on a first surface of the support substrate, and first and second lead-out patterns connected to the first coil pattern and respectively exposed to the first end surface and the second end surface of the body. A center of an exposed surface of the first lead-out pattern is closer to the first side surface of the body than the second side surface of the body, and a center of an exposed surface of the second lead-out pattern is closer to the first side surface of the body than the second side surface of the body.

According to still another aspect of the present disclosure, a coil component includes: a body having a first end surface and a second end surface opposing each other, and having a first side surface and a second side surface connecting the first end surface and the second end surface and opposing each other in a first direction; a support substrate disposed in the body; and a coil portion including a first coil pattern disposed on a first surface of the support substrate, and first and second lead-out patterns connected to the first coil pattern and respectively exposed to the first end surface and the second end surface of the body. Each of the first and second lead-out patterns is disposed asymmetrically with respect to a center line of the body, connecting each center of the first and second end surfaces of the body to each other, in the first direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
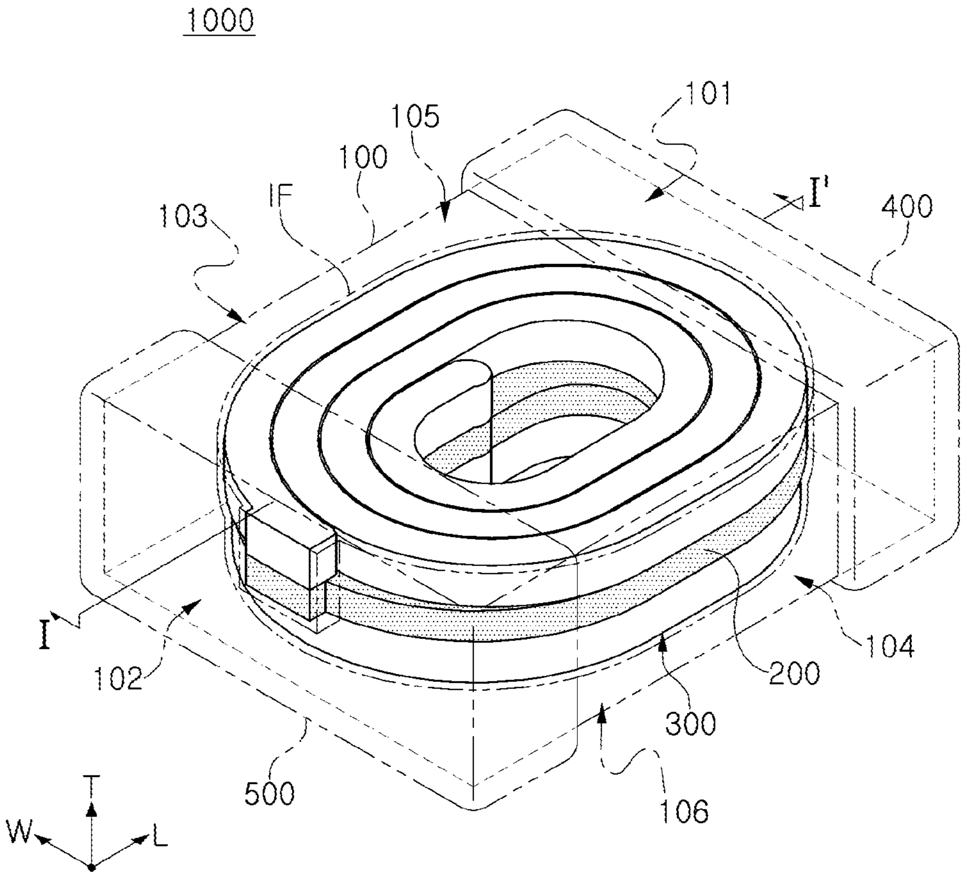
FIG. 1 is a view schematically illustrating a coil component according to an embodiment of the present disclosure.

Hereinafter, embodiments of the present disclosure will be described as follows with reference to the attached drawings. The terms used in the exemplary embodiments are used to simply describe an exemplary embodiment, and are not intended to limit the present disclosure. A singular term includes a plural form unless otherwise indicated. The terms, “include,” “comprise,” “is configured to,” etc. of the description are used to indicate the presence of features, numbers, steps, operations, elements, parts or combination thereof, and do not exclude the possibilities of combination Or addition of one or more features, numbers, steps, operations, elements, parts or combination thereof. Also, the term “disposed on,” “positioned on,” and the like, may indicate that an element is positioned on or beneath an object, and does not necessarily mean that the element is positioned on the object with reference to a gravity direction.

The term “coupled to,” “combined to,” and the like, may not only indicate that elements are directly and physically in contact with each other, but also include the configuration in which the other element is interposed between the elements such that the elements are also in contact with the other component.

Sizes and thicknesses of elements illustrated in the drawings are indicated as examples for ease of description, and exemplary embodiments in the present disclosure are not limited thereto.

In the drawings, an L direction is a first direction or a length direction, a W direction is a second direction or a width direction, a T direction is a third direction or a thickness direction.

In the descriptions described with reference to the accompanied drawings, the same elements or elements corresponding to each other will be described using the same reference numerals, and overlapped descriptions will not be repeated.

In electronic devices, various types of electronic components may be used, and various types of coil components may be used between the electronic components to remove noise, or the like.

In other words, in electronic devices, a coil component may be used as a power inductor, a high frequency (HF) inductor, a general bead, a high frequency (GHz) bead, a common mode filter, and the like.

Figure 2:
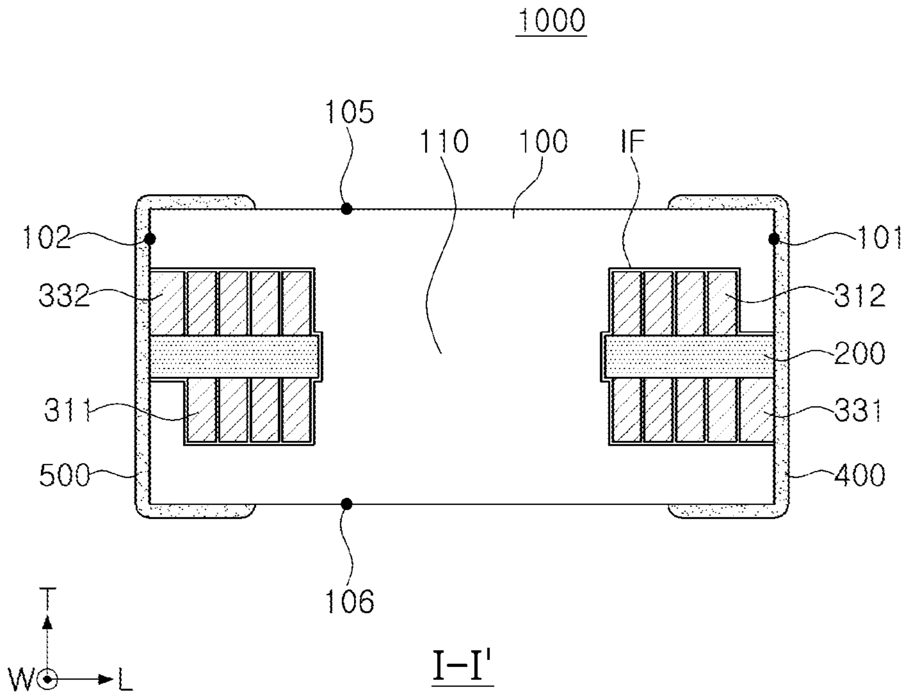
FIG. 2 is a view illustrating a cross-section taken along line I-I' of FIG. 1.
Figure 3A:
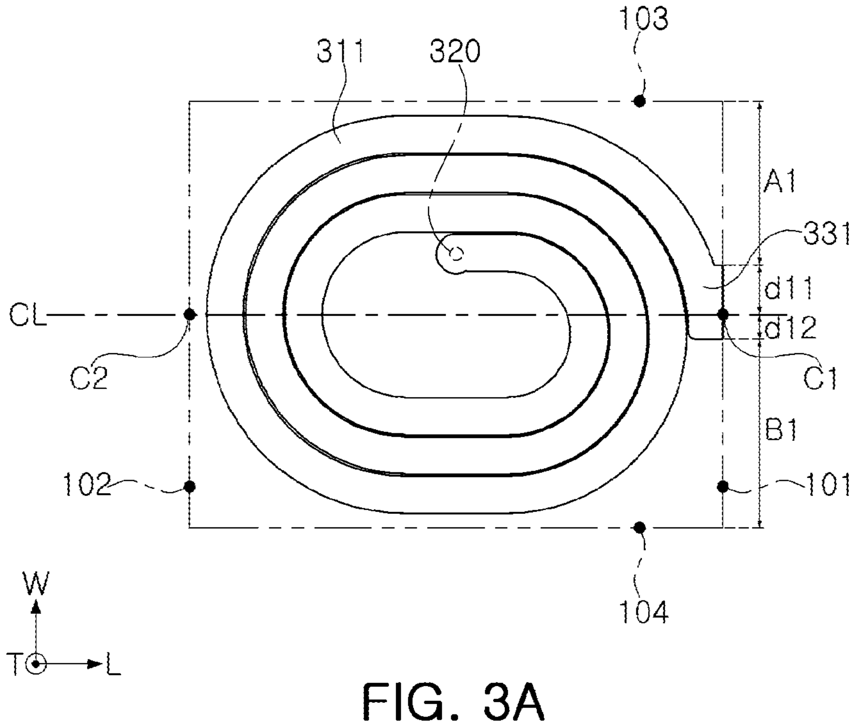
FIG. 3A is a schematic view illustrating a first coil pattern and a first lead-out pattern as viewed from above in FIG. 1.
Figure 3B:
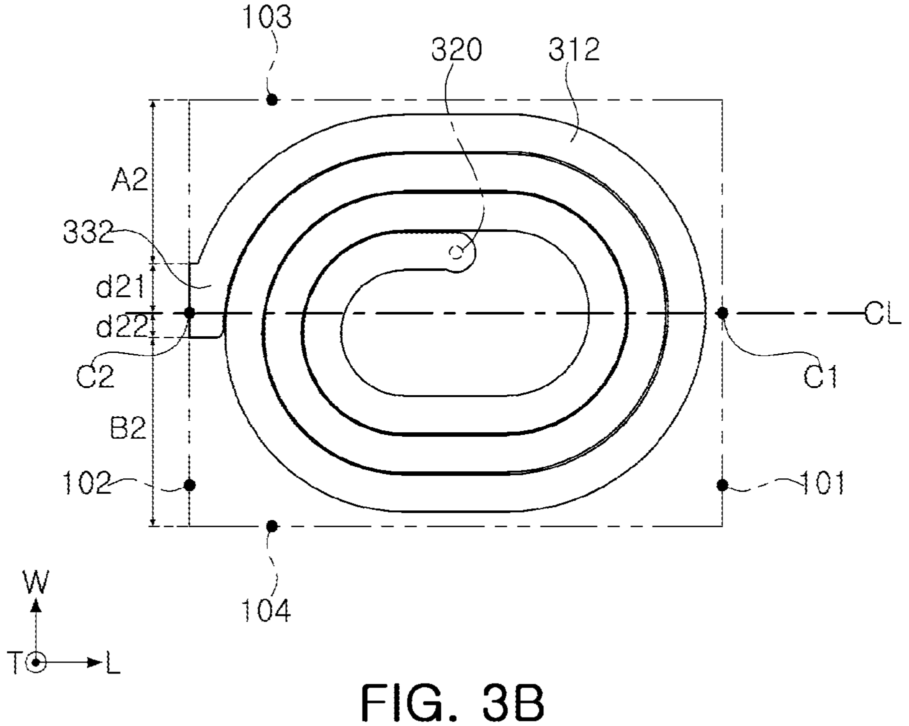
FIG. 3B is a view schematically illustrating a second coil pattern and a second lead-out pattern as viewed from above in FIG. 1.

FIG. 1 is a view schematically illustrating a coil component according to an embodiment of the present disclosure. FIG. 2 is a view illustrating a cross-section taken along line I-I' of FIG. 1. FIG. 3A is a schematic view illustrating a first coil pattern and a first lead-out pattern as viewed from above in FIG. 1. FIG. 3B is a view schematically illustrating a second coil pattern and a second lead-out pattern as viewed from above in FIG. 1.

Referring to FIGS. 1 to 3B, a coil component 1000 according to an embodiment of the present disclosure may include a body 100, a support substrate 200, a coil portion 300, and external electrodes 400 and 500, and may further include an insulating film IF.

The body 100 may form an exterior of the coil component 1000 according to the present embodiment, and the coil portion 300 and the support substrate 200 are disposed therein.

The body 100 may have a hexahedral shape overall.

Based on directions of FIGS. 1 to 3, the body 100 includes a first surface 101 and a second surface 102 opposing each other in a length direction L, a third surface 103 and a fourth surface 104 opposing each other in a width direction W, and a fifth surface 105 and a sixth surface 106 opposing each other in a thickness direction T. Each of the first to fourth surfaces 101, 102, 103, and 104 of the body 100 may correspond to a wall surface of the body 100 connecting the fifth surface 105 and the sixth surface 106 of the body 100. In the description below, two end surfaces (a first end surface and a second end surface) of the body 100 may refer to the first surface 101 and the second surface 102 of the body 100, respectively, two side surfaces (a first side surface and a second side surface) of the body 100 may refer to the third surface 103 and the fourth surface 104 of the body 100, respectively, and a first surface and a second surface of the body 100 may refer to the sixth surface 106 and the fifth surface 105 of the body 100, respectively. The sixth surface 106 of the body 100 may be used as a mounting surface when the coil component 1000 according to the present embodiment is mounted on a mounting substrate such as a printed circuit board.

For example, the body 100 may be formed such that the coil component 1000 according to the present embodiment in which external electrodes 400 and 500 to be described later are formed has a length of 2.0 mm, a width of 1.6 mm, and a thickness of 0.65 mm, or has a length of 2.0 mm, a width of 1.2 mm, and a thickness of 0.65 mm, but is not limited thereto. Meanwhile, since the dimensions described above are merely dimensions on design that do not reflect process errors and the like, it should be considered that they are within the scope of the present disclosure to the extent that process errors may be recognized.

The length of the coil component 1000 may refer to a maximum value, among dimensions of a plurality of line segments, connecting an outermost boundary line of the coil component 1000 illustrated in the cross-sectional image, and parallel to a length (L) direction of the coil component 1000, with reference to an image for a cross-section of the coil component 1000 in a length (L) direction (L)-a thickness (T) direction in a central portion of the coil component 1000 in a width direction (W), obtained by an optical microscope or a scanning electron microscope (SEM). Alternatively, the length of the coil component 1000 described above may refer to an arithmetic mean value of at least two dimensions, among a plurality of line segments connecting an outermost boundary line of the coil component 1000 illustrated in the cross-sectional image, and parallel to the length (L) direction of the coil component 1000.

The thickness of the coil component 1000 described above may refer to a maximum value, among dimensions of a plurality of line segments, connecting an outermost boundary line of the coil component 1000 illustrated in the cross-sectional image, and parallel to a thickness (T) direction of the coil component 1000, with reference to an image for a cross-section of the coil component 1000 in a length (L) direction-a thickness (T) direction in a central portion of the coil component 1000 in a width direction (W), obtained by an optical microscope or a scanning electron microscope (SEM). Alternatively, the thickness of the coil component 1000 described above may refer to an arithmetic mean value of at least two dimensions, among a plurality of line segments connecting an outermost boundary line of the coil component 1000 illustrated in the cross-sectional image, and parallel to the thickness (T) direction of the coil component 1000.

The width of the coil component 1000 described above may refer to a maximum value, among dimensions of a plurality of line segments, connecting an outermost boundary line of the coil component 1000 illustrated in the cross-sectional image, and parallel to the width (W) direction of the coil component 1000, with reference to an image for a cross-section of the coil component 1000 in a length (L) direction-a thickness (T) direction in a central portion of the coil component 1000 in a width (W) direction, obtained by an optical microscope or a scanning electron microscope (SEM). Alternatively, the width of the coil component 1000 described above may refer to an arithmetic mean value of at least two dimensions, among a plurality of line segments, connecting an outermost boundary line of the coil component 1000 illustrated in the cross-sectional image, and parallel to the width (W) direction of the coil component 1000.

Alternatively, each of the length, the width, and the thickness of the coil component 1000 may be measured by a micrometer measurement method. The micrometer measurement method may measure sizes by setting a zero point using a Gage repeatability and reproducibility (R&R) micrometer, inserting the coil component 1000 according to the present embodiment into a space between tips of the micrometer, and turning a measurement lever of the micrometer. Meanwhile, when the length of the coil component 1000 is measured by the micrometer measurement method, the length of the coil component 1000 may refer to a value measured one time, or may refer to an arithmetic means of values measured multiple times. The same configuration may also be applied to the width and the thickness of the coil component 1000.

The body 100 may include a magnetic material. Specifically, the body 100 may be formed by laminating one or more magnetic composite sheets in which a magnetic material is dispersed in a resin. However, the body 100 may have a structure other than the structure in which the magnetic material is dispersed in the resin. For example, the body 100 may also be formed of a magnetic material such as ferrite.

The magnetic material may be ferrite or magnetic metal powder.

The ferrite powder may include, for example, at least one or more materials among a spinel ferrite such as an Mg—Zn ferrite, an Mn—Zn ferrite, an Mn—Mg ferrite, a Cu—Zn ferrite, an Mg—Mn—Sr ferrite, an Ni—Zn ferrite, and the like, a hexagonal ferrite such as a Ba—Zn ferrite, a Ba—Mg ferrite, a Ba—Ni ferrite, a Ba—Co ferrite, a Ba—Ni—Co ferrite, and the like, a garnet ferrite such as a Y ferrite, and a Li ferrite.

The magnetic metal powder may include one or more elements selected from a group consisting of iron (Fe), silicon (Si), chromium (Cr), cobalt (Co), molybdenum (Mo), aluminum (Al), niobium (Nb), copper (Cu), and nickel (Ni). For example, the magnetic metal powder may be one or more materials among a pure iron powder, a Fe—Si alloy powder, a Fe—Si—Al alloy powder, a Fe—Ni alloy powder, a Fe—Ni—Mo alloy powder, Fe—Ni—Mo—Cu alloy powder, a Fe—Co alloy powder, a Fe—Ni—Co alloy powder, a Fe—Cr alloy powder, a Fe—Cr—Si alloy powder, a Fe—Si—Cu—Nb alloy powder, a Fe—Ni—Cr alloy powder, and a Fe—Cr—Al alloy powder.

The magnetic metal powder may be amorphous or crystalline. For example, the magnetic metal powder may be Fe—Si—B—Cr amorphous alloy powder, but is not necessarily limited thereto.

The magnetic metal powder may have an average diameter of about 0.1 μm to 30 μm, respectively, but is not limited thereto. Meanwhile, the average diameter of the magnetic metal powder may refer to a particle size distribution of particles represented by D50 or D90.

The body 100 may include two or more types of magnetic materials dispersed in a resin. Here, the notion that types of the magnetic materials are different may indicate that the magnetic materials dispersed in the resin are distinguished from each other by one of an average diameter, a composition, crystallinity, and a shape.

The resin may include one of an epoxy, a polyimide, a liquid crystal polymer, or a mixture thereof, but is not limited thereto.

The body 100 may include a core 110 penetrating through the coil portion 300 and the support substrate 200 to be described later. The core 110 may be formed by filling a through-hole penetrating through a central portion of each of the coil portion 300 and the support substrate 200 with a magnetic composite sheet, but is not limited thereto.

The support substrate 200 is configured to support the coil portion 300 to be described later. The support substrate 200 is disposed on the body 100. In the present embodiment, the support substrate 200 is not exposed to a surface of the body 100, other than a portion supporting first and second lead-out patterns 331 and 332, to be described later. A portion of the support substrate 200 supporting the first and second lead-out patterns 331 and 332 is exposed to the first and second surfaces 101 and 102 of the body 100, together with the first and second lead-out patterns 331 and 332.

The support substrate 200 may be formed of an insulating material including a thermosetting insulating resin such as an epoxy resin, a thermoplastic insulating resin such as a polyimide, or a photosensitive insulating resin, or may be formed of an insulating material in which a reinforcing material such as a glass fiber or an inorganic filler is impregnated with such an insulating resin. For example, the support substrate 200 may be formed of an insulating material such as prepreg, Ajinomoto Build-up Film (ABF), FR-4, a bismaleimide triazine (BT) resin, a photoimageable dielectric (PID), and the like, but is not limited thereto.

As an inorganic filler, at least one or more elements selected from a group consisting of silica ($SiO_2$), alumina ($Al_2O_3$), silicon carbide (SiC), barium sulfate ($BaSO_4$), talc, mud, a mica powder, aluminium hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

When the support substrate 200 is formed of an insulating material including a reinforcing material, the support substrate 200 may provide improved stiffness. When the support substrate 200 is formed of an insulating material which does not include a glass fiber, it is advantageous that the support substrate 200 may reduce an overall thickness of the coil portion 200 according to a present embodiment. In addition, a volume occupied by the coil portion 300 and/or magnetic materials may be increased based on components having the same volume, thereby improving characteristics of the component. When the support substrate 200 is formed of an insulating material including a photosensitive insulating resin, the number of processes for forming the coil portion 300 is reduced, which is advantageous in reducing production costs, and fine vias can be formed.

The coil portion 300 may be disposed in the body 100 to exhibit characteristics of the coil component. For example, when the coil component 1000 according to the present embodiment is used as a power inductor, the coil portion 300 may serve to stabilize power supply of electronic devices by storing an electric field as a magnetic field and maintaining an output voltage.

The coil portion 300 includes coil patterns 311 and 312, a via 320, and lead-out patterns 331 and 332. Specifically, based on a direction of FIGS. 1 and 2, the first coil pattern 311 and the first lead-out pattern 312 are disposed on a lower surface of the support substrate 200, opposing the sixth surface 106 of the body 100 to be connected in contact with each other, and the second coil pattern 312 and the second lead-out pattern 332 are disposed on an upper surface of the support substrate 200, opposing the lower surface of the support substrate 200 to be connected in contact with each other. The via 320 (see FIGS. 3A and 3B) penetrates through the support substrate 200 and are connected to be in contact with an inner end portion of each of the first coil pattern 311 and the second coil pattern 312. The first and second lead-out patterns 331 and 332 are connected to the first and second coil patterns 311 and 312 to be exposed to the first and second surfaces 101 and 102 of the body 100, and are connected to external electrodes 400 and 500 to be described later, respectively. Thereby, the coil portion 300 function as a single coil overall between the first and second external electrodes 400 and 500.

Each of the first coil pattern 311 and the second coil pattern 312 may have a planar spiral shape in which at least one turn is formed around the core as an axis. For example, the first coil pattern 311 may form at least one turn around the core 110 on a lower surface of the support substrate 200.

Each of the lead-out patterns 331 and 332 is exposed to the first and second surfaces 101 and 102 of the body 100, respectively. Specifically, the first lead-out pattern 331 is exposed to the first surface 101 of the body 100, and the second lead-out pattern 102 is exposed to the second surface 102 of the body 100.

At least one of the coil patterns 311 and 312, the via 320, and the lead-out patterns 331 and 332 may include at least one conductive layer. As an example, when the second coil pattern 312, the via 320, and the second lead-out pattern 332 are formed on an upper surface side of the support substrate 200 by plating, the second coil pattern 312, the via 320, and the second lead-out pattern 332 may include a seed layer and an electroplating layer, respectively. Here, the electroplating layer may have a single layer structure or a multilayer structure. The electroplating layer with a multilayer structure may have a conformal film structure in which one electroplating layer is formed along a surface of the other electroplating layer, and may have a form in which the other electroplating layer is laminated only on one side of one electroplating layer. The seed layer may be formed by a vapor deposition method such as electroless plating, sputtering, or the like. The seed layer of each of the second coil pattern 312, the via 320, and the second lead-out pattern 332 may be integrally formed, such that a boundary therebetween may not be formed, but is not limited thereto. The electroplating layer of each of the second coil pattern 312, the via 320, and the second lead-out pattern 332 may be integrally formed, such that a boundary therebetween may not be formed, but is not limited thereto.

As another example, when the first coil pattern 311 and the first lead-out pattern 331, disposed on the lower surface side of the support substrate 200, and the second coil pattern 312 and the second lead-out pattern 332, disposed on the upper surface side of the support substrate 200, are formed separately from each other and then collectively stacked on the support substrate 200 to form a coil portion 300, the via 320 may include a high melting-point metal layer and a low melting-point metal layer having a lower melting point than the high melting-point metal layer. Here, the low melting-point metal layer may be formed of solder including lead (Pb) and/or tin (Sn). At least a portion of the low melting-point metal layer may be melted due to the pressure and temperature during batch lamination, for example, an intermetallic compound layer (IMC layer) may be formed at a boundary between the low melting-point metal layer and the second coil pattern 312.

As an example, the coil patterns 311 and 312 and the lead-out patterns 331 and 332 may be formed to protrude from the lower and upper surfaces of the support substrate 200, respectively, as illustrated in FIG. 2. As another example, the first coil pattern 311 and the first lead-out pattern 331 may be formed to protrude on the lower surface of the support substrate 200, and the second coil pattern 312 and the second lead-out pattern 332 may be buried in the upper surface of the support substrate 200 and the upper surface thereof may be exposed to the upper surface of the support substrate 200. In this case, a concave portion may be formed on the upper surface of the second coil pattern 312 and/or the upper surface of the second lead-out pattern 332, so that the upper surface of the second coil pattern 312 and/or the upper surface of the second lead-out pattern 332 may not be located on the same plane as the upper surface of the support substrate 200.

Each of the coil patterns 311 and 312, the via 320, and the lead-out patterns 331 and 332 may be formed of a conductive material such as copper (Cu), aluminum (Al), silver (Ag), tin (Sn), gold (Au), nickel (Ni), lead (Pb), titanium (Ti), chromium (Cr), or an alloy thereof, but is not limited thereto.

When a virtual line connecting the centers C1 and C2 of each of the first and second surfaces 101 and 102 of the body 100 in the width direction W is referred to as a center line CL, the first and second lead-out patterns 331 and 332 of the coil portion 300 are disposed asymmetrically with respect to the center line CL in the width direction W. Specifically, referring to FIG. 3A, the first lead-out pattern 331 has one side end, adjacent to the third surface 103 of the body 100 and the other side end opposing the one side end and adjacent to the fourth surface 104 of the body 100. A distance A1 between the third surface 103 of the body 100 and one side end of the first lead-out pattern 331 in the width direction W is smaller than a distance B1 between the fourth surface 104 of the body 100 and the other side end of the first lead-out pattern 331 in the width direction W. Referring to FIG. 3B, the second lead-out pattern 332 has one side end, adjacent to the third surface 103 of the body 100, and the other end opposing the one side end and adjacent to the fourth surface 104 of the body 100. A distance A2 between the third surface 103 of the body 100 and one side end of the second lead-out pattern 332 in the width direction W is smaller than a distance B2 between the fourth surface 104 of the body 100 and the other side end of the second lead-out pattern 332 in the width direction W. In other words, a center of an exposed surface of the first lead-out pattern 331 is closer to the third surface 103 of the body 100 than the fourth surface 104 of the body 100, and a center of an exposed surface of the second lead-out pattern 332 is closer to the third surface 103 of the body 100 than the fourth surface 104 of the body 100.

As the thickness of the component decreases, a thickness of a cover region disposed above and below the coil of a component body decreases. When the thickness of the cover region becomes thinner, cracks may occur in the component body due to a dicing process or the like, and chipping defects may increase. Therefore, as a method for reducing chipping defects while reducing the thickness of the component, it may be considered to increase the thickness of the cover region by making the coil thickness thin. However, when the thickness of the coil is made thin, an inductance (Ls) of the component decreases due to a reduction in a conductor component in the component. In the present disclosure, in order to solve the above-described inductance (Ls) reduction problem, the first and second lead-out patterns 331 and 332 of the coil portion 300 are disposed asymmetrically with respect to the center line CL of the body 100 in the width direction W. Accordingly, in the coil component 1000 according to the present embodiment, a formation area of a core 110 may be increased by adjusting only the positions of the first and second lead-out patterns 331 and 332 within the body 100, as compared with the component having the same remaining conditions.

The distance A1 between the third surface 103 of the body 100 and one side end of the first lead-out pattern 331 in the width direction W and the distance A2 between the third surface 103 of the body 100 and one side end of the second lead-out pattern 332 in the width direction W may be substantially the same as each other. That is, each of the first and second lead-out patterns 331 and 332 may be asymmetrically disposed with respect to the center line CL in the width direction W of the body 100, but the first and second lead-out patterns 331 and 332 may be disposed symmetrically to each other. Since the first and second lead-out patterns 331 and 332, which are both end portions of the coil portion 300, are formed in symmetrical positions with each other, it is possible to more easily prevent warpage of the support substrate 200 during the process, and ease of handling of the support substrate 200 during the process may increase. One or ordinary skill in the art would understand that the expression "substantially the same" refers to being the same by allowing process errors, positional deviations, and/or measurement errors that may occur in a manufacturing process.

Since a distance d11 between one side end of the first lead-out pattern 331 and the center line CL along the width direction W may be longer than a distance d12 between the other side end of the first lead-out pattern 331 and the center line CL in the width direction W, and a distance d21 between one side end of the second lead-out pattern 332 and the center line CL in the width direction W may be longer than a distance d22 between the other side end of the second lead-out pattern 332 and the center line CL in the width direction W. That is, while positioning each of the first and second lead-out patterns 331 and 332 asymmetrically with respect to the center line CL, each of the first and second lead-out patterns 331 and 332 may be positioned near the center (the center line CL) in the width direction W. Since the lead-out patterns 331 and 332 are located near the center (the center line CL) in the width direction W, it is possible to prevent warpage of the support substrate 200 during the process, and ease of handling of the support substrate 200 between the processes may increase.

The distance d11 between one side end of the first lead-out pattern 331 and the center line CL in a width direction W and the distance d21 between one side end of the second lead-out pattern 332 and the center line CL in a width direction W may be substantially the same as each other. Since the first and second lead-out patterns 331 and 332, which are both end portions of the coil portion 300, are formed in symmetrical positions with each other, it is possible to more easily prevent warpage of the support substrate 200 during the process, and ease of handling of the supporting substrate 200 during the process may increase.

According to one exemplary embodiment, a width of the first lead-out pattern 331 in the width direction W may be substantially equal to a width of the second lead-out pattern 332 in the width direction W.

The via 320 may be disposed closer to the third surface 103 of the body 100 than to the fourth surface 104 of the body 100. Referring to FIGS. 3A and 3B, due to the asymmetrical positions of the first and second lead-out patterns 331 and 332, a conductor constituting the coil portion 300 may be disposed more on an upper side than on a lower side of the center line CL. In addition, an area of an interface between the support substrate 200 and the coil portion 300 must be greater in the upper side than in the lower side of the center line CL of FIGS. 3A and 3B. For this reason, stress applied to the coil portion 300 must be greater in the upper side than in the lower side based on the center line CL of FIGS. 3A and 3B, considering that cracks are likely to occur at the interface between components containing different materials, the possibility of delamination between the support substrate 200 and the coil portion 300 must be greater in the upper side than the lower side based on the center line CL of FIGS. 3A and 3B. Since the via 320 penetrates through the support substrate 200, mechanical coupling force between the coil portion 300 and the support substrate 200 may be improved. Therefore, in the case of the present embodiment, by disposing the via 320 penetrating through the support substrate 200 on the upper side of the center line CL in FIGS. 3A and 3B, the mechanical coupling force between the support substrate 200 and the coil portion 300 may be disposed. That is, by disposing the via 320 closer to the third surface 103 of the body 100 than the fourth surface 104 of the body 100, the coupling force between the support substrate 200 and the coil portion 300 may be improved.

The external electrodes 400 and 500 are disposed to be spaced apart from each other on the sixth surface 106 of the body 100 and are connected to the coil portion 300. Specifically, the first external electrode 400 is disposed on the first surface 101 of the body 100 and is connected to be in contact with the first lead-out pattern 331 exposed to the first surface 101 of the body 100, and is disposed to extend to at least a portion of each of the third to sixth surfaces 103, 104, 105, and 106 of the body 100. The second external electrode 500 is disposed on the second surface 102 of the body 100 and is disposed to be in contact with the second lead-out pattern 332 exposed to the second surface 102 of the body 100, and is disposed to extend to at least a portion of each of the third to sixth surfaces 103, 104, 105, and 106 of the body 100. However, the scope of the present disclosure is not limited thereto, and the external electrodes 400 and 500 may be formed in an L shape or a C shape, respectively. In addition, the external electrodes 400 and 500 may be disposed only on the sixth surface 106 of the body 100.

The external electrodes 400 and 500 may include a conductive material such as copper (Cu), aluminum (Al), silver (Ag), tin (Sn), gold (Au), nickel (Ni), lead (Pb), chromium (Cr), and titanium (Ti), or an alloy thereof. The external electrodes 400 and 500 may be formed by coating and curing a conductive paste containing conductive powder and an insulating resin, formed by a vapor deposition method such as sputtering, or the like, or formed by a plating method, but the scope of the present disclosure is limited thereto.

The external electrodes 400 and 500 may be formed as a single or multilayer structure. As an example, the first external electrode 400 may include a first conductive layer including copper (Cu), a second conductive layer disposed on the first conductive layer and including nickel (Ni), and a third conductive layer disposed on the second conductive layer and including tin (Sn). At least one of the second conductive layer and the third conductive layer may be formed to cover the first conductive layer, but the scope of the present disclosure is not limited thereto. At least one of the second conductive layer and the third conductive layer may be disposed only on the sixth surface 106 of the body 100, but the scope of the present disclosure is not limited thereto. The first conductive layer may be a metal layer formed by plating, vapor deposition, or the like, or may be a conductive resin layer formed by coating and curing a conductive paste including conductive powder and a resin. The second and third conductive layers may be plating layers, but the scope of the present disclosure is not limited thereto.

The insulating film IF is disposed between the coil portion 300 and the body 100, and between the support substrate 200 and the body 100. The insulating film IF may be formed along the surface of the support substrate 200 on which the coil patterns 311 and 312 and the lead-out patterns 331 and 332 are formed, but is not limited thereto. The insulating film IF is for insulating the coil portion 300 and the body 100, and may include a known insulating material such as parylene, but is not limited thereto. As another example, the insulating film IF may include an insulating material such as an epoxy resin, other than parylene. The insulating film IF may be formed by a vapor deposition method, but is not limited thereto. As another example, the insulating film IF may be formed by laminating and curing an insulating film for forming the insulating film IF on both surfaces of the support substrate 200 on which the coil component 300 is formed, and may also be formed by coating and curing an insulation paste for forming the insulating film IF on both surfaces of the formed support substrate 200. Meanwhile, for the reasons described above, the insulating film IF is an element that can be omitted in the present embodiment. That is, if the body 100 has sufficient electrical resistance at the designed operating current and voltage of the coil component 1000 according to the present embodiment, the insulating film IF may be omitted in the present embodiment.

Meanwhile, although not shown, the coil component 1000 according to the present embodiment may further include a surface insulating layer disposed on the body 100. The surface insulating layer may be disposed in a region, other than at least a portion of a region in which the external electrodes 400 and 500 are disposed among the first to sixth surfaces 101, 102, 103, 104, 105, and 106 of the body 100. The surface insulating layer may include a thermoplastic resin such as polystyrene, vinyl acetate, polyester, polyethylene, polypropylene, polyamide, rubber, acrylic, or the like, a thermosetting resin such as phenolic, epoxy, urethane, melamine, alkyd, or the like, a photosensitive resin, parylene, $SiO_x$ or $SiN_x$. The surface insulating layer may further include an insulating filler such as an inorganic filler, but is not limited thereto.

Figure 4:
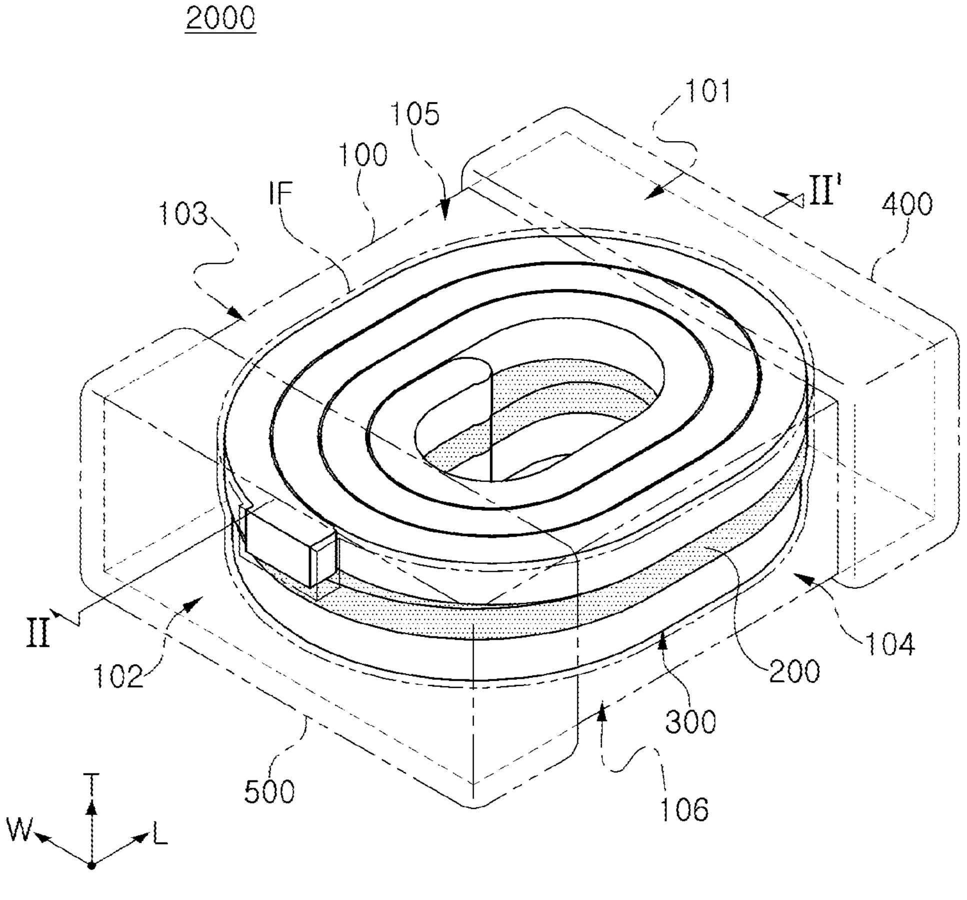
FIG. 4 is a view schematically illustrating a coil component according to another embodiment of the present disclosure.
Figure 5:
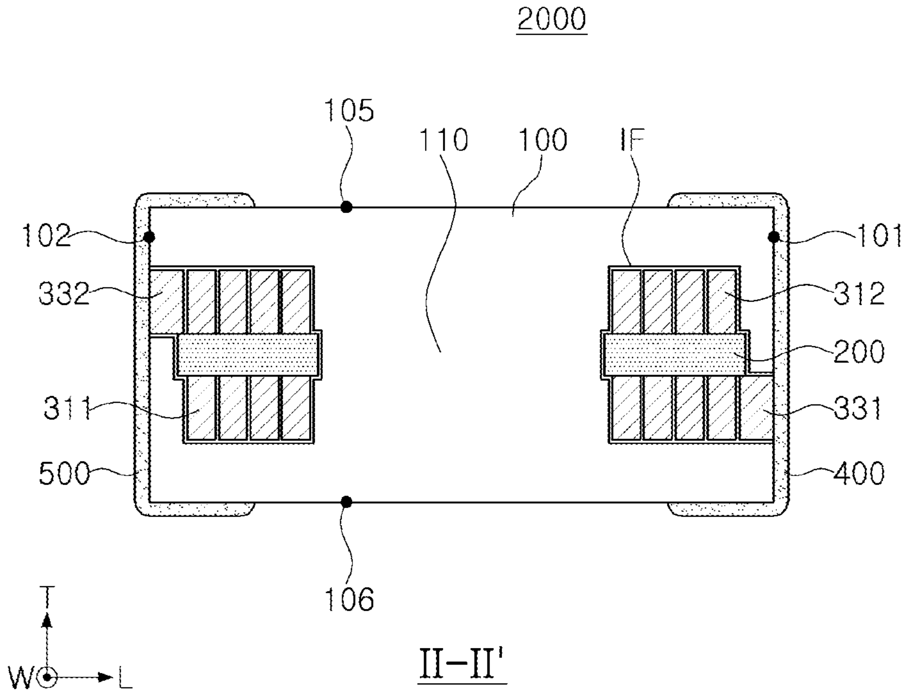
FIG. 5 is a view showing a cross-section taken along line II-II' of FIG. 4.

FIG. 4 is a view schematically illustrating a coil component according to another embodiment of the present disclosure. FIG. 5 is a view illustrating a cross-section taken along line II-II' of FIG. 4.

Referring to FIGS. 1 to 3, and 4 to 5, a coil component 2000 according to the present embodiment has a different structure of a support substrate 200 and an insulating film IF, compared to the coil component 1000 according to an embodiment of the present disclosure. Accordingly, in describing the present embodiment, only the support substrate 200 and the insulating film IF, different from those in the embodiment of the present disclosure, will be described. For the remainder of the configuration of the present embodiment, the description in the embodiment of the present disclosure may be applied as it is.

Referring to FIGS. 4 and 5, in the present embodiment, the support substrate 200 is not exposed to the first and second surfaces 101 and 102 of the body 100. Accordingly, in the case of the present embodiment, unlike in the present embodiment of the present disclosure, only lead-out patterns 331 and 332 and the insulating film IF are exposed on the first and second surfaces 101 and 102 of the body 100. In the case of the present embodiment, in a substrate trimming process of processing the shape of the support substrate 200 after plating the coil component 300, at least a portion of a region of the support substrate 200 disposed below the lead-out patterns 331 and 332, and the insulating film IF may be formed, and then the body 100 may be formed. As a result, referring to FIG. 5, the insulating film IF covers both side surfaces of the support substrate 200, opposing the first and second surfaces 101 and 102 of the body (corresponds to a boundary line of the support substrate 200 opposing the second surface 102 of the body 100 of FIG. 5 and a boundary line of the support substrate 200 opposing the first surface 101 of the body 100), and is in contact with at least a portion of each of an upper surface of the first lead-out pattern 331 and a lower surface of the second lead-out patter 3322, based on the direction of FIG. 5. Meanwhile, since the first to fourth surfaces 101, 102, 103, and 104 of the body 100 are formed due to the dicing process, the insulating film IF is exposed to the first and second surfaces 101 and 102 of the body 100. In addition, the insulating film IF is exposed in a form covering all boundaries between the lead-out patterns 331 and 332 and the body 100 on the first and second surfaces 101 and 102 of the body 100.

In the present embodiment, since the support substrate 200 is not exposed to the first and second surfaces 101 and 102 of the body 100, bonding force between external electrodes 400 and 500 and the body 100 may be improved. In addition, since a magnetic material can be additionally disposed as much as a volume from which the support substrate 200 is removed, an effective volume of the magnetic material can be increased based on components of the same volume.

As set forth above, according to embodiments of the present disclosure, a coil component capable of reducing chipping defects may be provided.

According to embodiments of the present disclosure, a coil component capable of securing an inductance Ls while reducing the overall thickness of the component may be provided.

While the exemplary embodiments have been shown and described above, it will be apparent to those skilled in the art that modifications and variations could be made without departing from the scope of the present invention as defined by the appended claims.

What is claimed is:

1. A coil component, comprising:

a body having a first end surface and a second end surface opposing each other, and having a first side surface and a second side surface connecting the first end surface to the second end surface and opposing each other in a first direction;

a support substrate disposed in the body; and a coil portion including a first coil pattern disposed on a first surface of the support substrate, and first and second lead-out patterns connected to the first coil pattern and respectively exposed to the first end surface and the second end surface of the body, wherein a distance between the first side surface of the body and the first lead-out pattern in the first direction is smaller than a distance between the second side surface of the body and the first lead-out pattern in the first direction, a distance between the first side surface of the body and the second lead-out pattern in the first direction is smaller than a distance between the second side surface of the body and the second lead-out pattern in the first direction, the coil portion further comprises a second coil pattern disposed on a second surface of the support substrate opposing the first surface of the support substrate, the coil portion further comprises a via penetrating through the support substrate and connecting an inner end portion of each of the first and second coil patterns to each other, and the via is disposed to be closer to the first side surface of the body than to the second side surface of the body.

2. The coil component of claim 1, wherein the distance between the first side surface of the body and the first lead-out pattern in the first direction is substantially equal to the distance between the first side surface of the body and the second lead-out pattern in the first direction.

3. The coil component of claim 1, wherein each of the first and second lead-out patterns has a first side end, adjacent to the first side surface of the body, and a second side end, opposing the first side end and adjacent to the second side surface of the body, wherein a virtual line connecting each center of the first end surface and the second end surface of the body to each other refers to a center line, wherein a distance between the first side end of the first lead-out pattern and the center line in the first direction is greater than a distance between the second side end of the first lead-out pattern and the center line in the first direction, and wherein a distance between the first side end of the second lead-out pattern and the center line in the first direction is greater than a distance between the second side end of the second lead-out pattern and the center line in the first direction.

4. The coil component of claim 3, wherein a distance between the first side end of the first lead-out pattern and the center line in the first direction is substantially the same as a distance between the first side end of the second lead-out pattern and the center line in the first direction.

5. The coil component of claim 1, wherein at least a portion of the first lead-out pattern is disposed on the first surface of the support substrate and is connected to be in contact with the first coil pattern, and wherein at least a portion of the second lead-out pattern is disposed on the second surface of the support substrate and is connected to be in contact with the second coil pattern.

6. The coil component of claim 5, wherein the support substrate is exposed to each of the first end surface and the second end surface of the body.

7. The coil component of claim 5, wherein the support substrate is spaced apart from each of the first end surface and the second end surface of the body.

8. The coil component of claim 7, further comprising an insulating film disposed between the coil portion and the body, wherein the insulating film covers a side surface of the support substrate parallel to each of the first end surface and the second end surface of the body.

9. The coil component of claim 8, wherein the insulating film covers all boundaries between the first and second lead-out patterns and the body in each of the first end surface end the second end surface of the body.

10. The coil component of claim 5, wherein the body further has a first surface connected to each of the first side surface, the second side surface, the first end surface, and the second end surface of the body, and the coil component further comprises first and second external electrodes disposed to be spaced apart from each other on the first surface of the body and respectively connected to the first and second lead-out patterns.

11. A coil component, comprising:

a body having a first end surface and a second end surface opposing each other, and having a first side surface and a second side surface connecting the first end surface to the second end surface and opposing each other in a first direction;

a support substrate disposed in the body; and a coil portion including a first coil pattern disposed on a first surface of the support substrate and a second coil pattern disposed on a second surface of the support substrate opposing the first surface of the support substrate, and first and second lead-out patterns respectively connected to the first and second coil patterns and respectively exposed to the first end surface and the second end surface of the body, wherein a center of an exposed surface of the first lead-out pattern is closer to the first side surface of the body than the second side surface of the body, and a center of an exposed surface of the second lead-out pattern is closer to the first side surface of the body than the second side surface of the body, the coil portion further comprises a via penetrating through the support substrate and connecting an inner end portion of each of the first and second coil patterns to each other, and the via is disposed to be closer to the first side surface of the body than to the second side surface of the body.

12. The coil component of claim 11, wherein a width of the first lead-out pattern in the first direction is substantially equal to a width of the second lead-out pattern in the first direction.

13. The coil component of claim 11, wherein a distance from the center of the exposed portion of the first lead-out pattern to the first side surface of the body in the first direction is substantially equal to a distance from the center of the exposed portion of the second lead-out pattern to the first side surface of the body in the first direction.

14. The coil component of claim 11, wherein the coil portion further comprises a second coil pattern disposed on a second surface of the support substrate opposing the first surface of the support substrate, wherein at least a portion of the first lead-out pattern is disposed on the first surface of the support substrate and is connected to be in contact with the first coil pattern, and wherein at least a portion of the second lead-out pattern is disposed on the second surface of the support substrate and is connected to be in contact with the second coil pattern.

15. The coil component of claim 11, wherein the support substrate is exposed to each of the first end surface and the second end surface of the body.

16. The coil component of claim 11, wherein the support substrate is spaced apart from each of the first end surface and the second end surface of the body.

17. The coil component of claim 11, further comprising an insulating film disposed between the coil portion and the body, wherein the insulating film covers a side surface of the support substrate parallel to each of the first end surface and the second end surface of the body.

18. The coil component of claim 11, further comprising first and second external electrodes respectively disposed on the first and second end surfaces of the body to be spaced apart from each other and respectively connected to the first and second lead-out patterns.

19. A coil component, comprising:

a body having a first end surface and a second end surface opposing each other, and having a first side surface and a second side surface connecting the first end surface to the second end surface and opposing each other in a first direction;

a support substrate disposed in the body; and a coil portion including a first coil pattern disposed on a first surface of the support substrate and a second coil pattern disposed on a second surface of the support substrate opposing the first surface of the support substrate, and first and second lead-out patterns respectively connected to the first and second coil patterns and respectively exposed to the first end surface and the second end surface of the body, wherein each of the first and second lead-out patterns is disposed asymmetrically with respect to a center line of the body, connecting each center of the first and second end surfaces of the body to each other, in the first direction, the coil portion further comprises a via penetrating through the support substrate and connecting an inner end portion of each of the first and second coil patterns to each other, and the via is disposed to be closer to the first side surface of the body than to the second side surface of the body.

20. The coil component of claim 19, wherein a center of an exposed surface of the first lead-out pattern is closer to the first side surface of the body than the second side surface of the body, and a center of an exposed surface of the second lead-out pattern is closer to the first side surface of the body than the second side surface of the body.

21. The coil component of claim 19, wherein a width of the first lead-out pattern in the first direction is substantially equal to a width of the second lead-out pattern in the first direction.

22. The coil component of claim 19, wherein a distance from the center of the exposed portion of the first lead-out pattern to the first side surface of the body in the first direction is substantially equal to a distance from the center of the exposed portion of the second lead-out pattern to the first side surface of the body in the first direction.

* * * * *